(12) United States Patent
Frank

(10) Patent No.: US 7,768,389 B2
(45) Date of Patent: Aug. 3, 2010

(54) WIRELESS USER INPUT DEVICE PROVIDING HOST LINK INDICATION

(75) Inventor: Edward H. Frank, Atherton, CA (US)

(73) Assignee: Broadcom Corporation, Irvine, CA (US)

( * ) Notice: Subject to any disclaimer, the term of this patent is extended or adjusted under 35 U.S.C. 154(b) by 570 days.

(21) Appl. No.: 11/697,742

(22) Filed: Apr. 9, 2007

(65) Prior Publication Data

US 2007/0184880 A1    Aug. 9, 2007

Related U.S. Application Data

(63) Continuation of application No. 10/403,531, filed on Mar. 31, 2003, now Pat. No. 7,203,526.

(51) Int. Cl.
*H04Q 1/30* (2006.01)
(52) U.S. Cl. .............. 340/531; 340/505; 340/506; 340/539.1; 340/539.11; 340/539.32; 340/572.1; 340/10.1; 340/5.3; 340/825.49; 340/5.2
(58) Field of Classification Search ............. 340/531, 340/539.1, 539.11, 539.13, 825.36, 825.49
See application file for complete search history.

(56) References Cited

U.S. PATENT DOCUMENTS 6,031,455 A * 2/2000 Grube et al. ........... 340/539.26

* cited by examiner

*Primary Examiner*—Daryl Pope
(74) *Attorney, Agent, or Firm*—Garlick Harrison & Markison; Kevin L. Smith

(57) ABSTRACT

A wireless interface device services communications between a wirelessly enabled host and at least one user input device. The wireless interface device includes a wireless interface unit, a processing unit, an input/output unit, and may include a power management unit. The wireless interface unit wirelessly interfaces with the wirelessly enabled host. The processing unit and the wireless interface unit interact to determine when the wireless interface unit has established a link with the wirelessly enabled host. When the wireless interface unit has established a link with the wirelessly enabled host, the processing unit interacts with the input/output unit to direct the input/output unit to output a link established indication. When the wireless interface unit enters a sniff mode or a park mode, a second link established indication may be provided. When the link is taken down or lost, a link non-established indication may be provided.

20 Claims, 12 Drawing Sheets

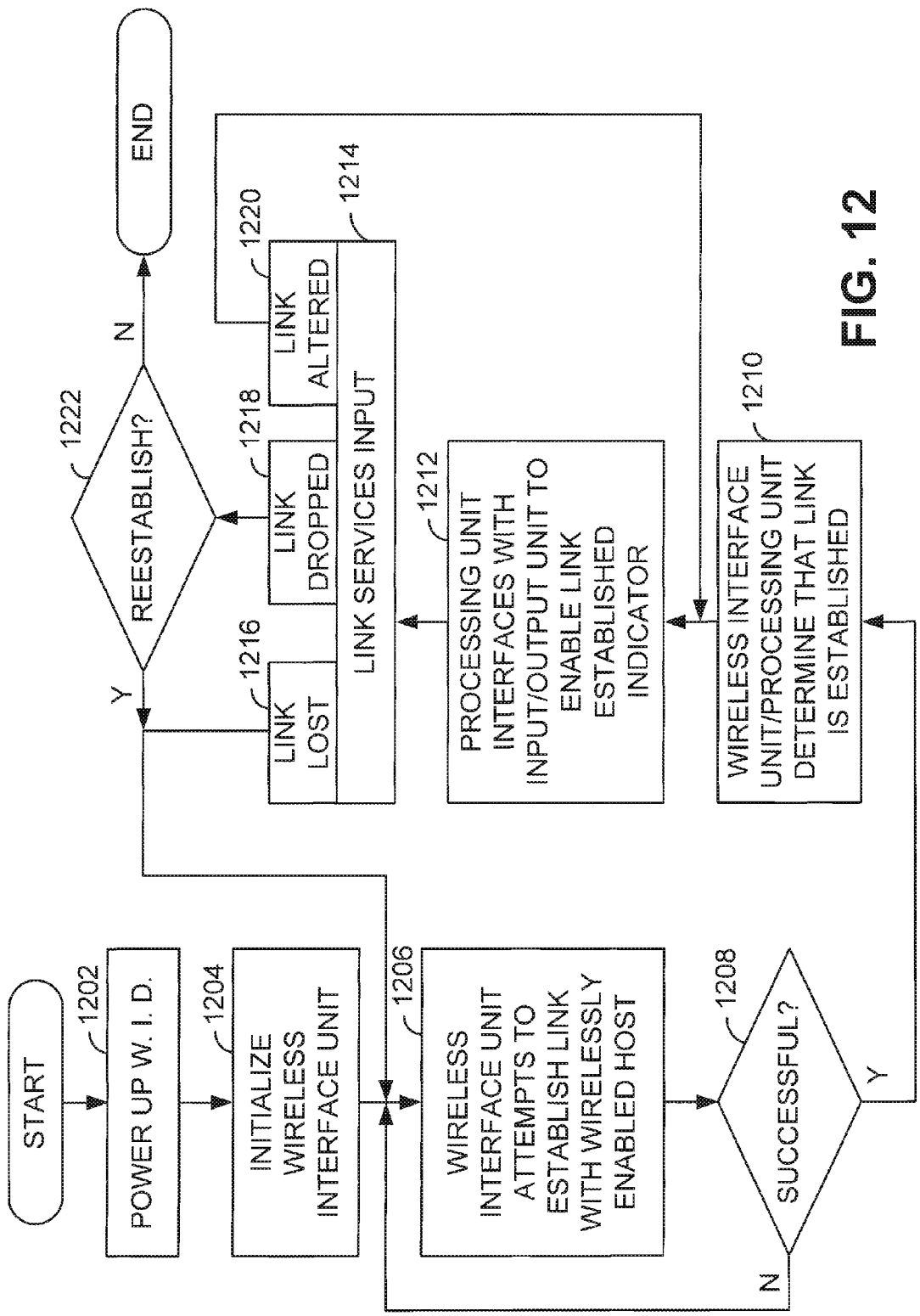

WIRELESS USER INPUT DEVICE PROVIDING HOST LINK INDICATION

CROSS REFERENCE TO RELATED APPLICATION

This application is a continuation of U.S. application Ser. No. 10/403,531, filed Mar. 31, 2003, which is hereby incorporated herein by reference in its entirety for all purposes.

SPECIFICATION

Background

1. Technical Field

The present invention relates generally to digital computers; and more particularly to wireless interface devices coupled to digital computers.

2. Related Art

Digital computers have been known in the art for years. Personal digital computers typically include a case, a video display, and one or more input/output devices. The case typically includes a power supply, a cooling fan, a motherboard, interface ports, peripheral cards, a disk drive, and other components. Contained on the motherboard are a processor, memory, a processor chip set, and one or more peripheral buses. The peripheral cards interface input/output devices with the motherboard via the peripheral buses. Other input/output devices may couple directly to the motherboard via appropriate connectors, for example, devices coupled via a parallel port, devices coupled via a serial port, and devices coupled via a USB.

Input devices receive input from a user or another source while output devices provide output to a user or another destination. Keyboards, computer mice, microphones, scanners, etc. are typically considered input devices because they receive input but provide no output. Monitors, speakers, printers, etc. are considered output devices because they provide output to the user but receive no input from the user. Other devices, such as touch sensitive monitors, that both receive input and produce output are considered to be both input and output devices.

Wireless communication technology has rapidly advanced over the past few years. Resultantly, computer input/output devices are now being called upon to wirelessly communicate with their "host" computers. Wireless keyboards and mice now couple via wireless connections to their host computers. These "wireless" input devices provide great benefits in that they require no wired connections with their host computers. However, the lack of a wired connection also requires that the wireless input devices contain their own power supply, that is, that they be battery powered. In order to extend the life of their batteries the wireless input devices often support power saving modes of operation. Unfortunately, none of these power savings modes reduces power consumption to levels that would extend battery life more than a few weeks. Resultantly, the benefits achieved via wireless connectivity is met or exceeded by the repeated chore and expense of frequently changing batteries in the device.

Another shortcoming of these devices relates to their perceived and actual reliability. Because these wireless input devices do not physically couple to the supported computing device, a user cannot determine when the device is "coupled" to the supported computing device. Non-responsiveness of the wireless input device may be caused by a failed device, low batteries, non-operational wireless link, or another operational difficulty. Because users cannot determine what causes the wireless input device to be non-responsive, they become frustrated and migrate toward wired peripheral devices.

Thus, there is a need in the art for a wireless input device that provides feedback to the user to indicate its operational state.

SUMMARY OF THE INVENTION

Thus in order to overcome the shortcomings of the prior devices among other shortcomings within the wireless user interface realm, a wireless interface device constructed according to the present invention services communications between a wirelessly enabled host and at least one user input device. The wireless interface device includes a wireless interface unit, a processing unit, an input/output unit, and may include a power management unit. According to the present invention, the processing unit and the wireless interface unit interact to determine when the wireless interface unit has established a link with the wirelessly enabled host. Further, when the wireless interface unit has established a link with the wirelessly enabled host, the processing unit interacts with the input/output unit to direct the input/output unit to output a link established indication.

In performing these operations, the wireless interface device indicates to the user when the wireless user input device is in communication with the wirelessly enabled host. If the serviced mouse, keyboard, etc. is not responsive even when link establishment is indicated, the user will then know that the operational problem is likely with the wirelessly enabled host. Further, when wireless interface device does not indicate that a link is established, the user will know that the wireless user input device requires attention. Attention may require the changing of batteries, more proximal location of the wireless user input device to the wirelessly enabled host, or other action.

The wireless interface device may also include a power management unit that manages power consumption of the wireless interface device. In such case, the wireless interface device supports a plurality of power consumption modes including a busy mode and at least one power saving mode. When the wireless interface device is in the busy mode the processing unit interacts with the input/output unit to provide a first link established indication when the link is established. Further, when the wireless interface device is in the at least one power saving mode the wireless interface unit enters a parked mode of operation. When the wireless interface is in the parked mode of operation, the processing unit interacts with the input/output unit to provide a second link established indication. The second link established indication differs from the first link established indication to indicate to the user that the wireless input device may not be immediately responsive in forwarding input, for example, key strokes or mouse movement, to the wirelessly enabled host. Alternatively, when the wireless interface device is in the at least one power saving mode the wireless interface unit may enter a sniff mode of operation. In such case, the processing unit may also interact with the input/output unit to provide a second link established indication for the same reasons.

In still another operation, when the wireless interface device is in the at least one power saving mode the wireless interface unit enters a power down mode of operation and the processing unit interacts with the input/output unit to provide a link non-established indication. Moreover, when the wireless interface device transitions from a power saving mode to the busy mode, the processing unit interacts with the input/output unit to provide a link being attempted indication.

These various indications provide feedback to the user to indicate the link status of the wireless user input device.

The wireless interface unit may support a wireless interface standard, for example, one or more versions of the Bluetooth interface standard. Further, the wireless interface device may be constructed on a single monolithic integrated circuit. The single monolithic integrated circuit may be contained within a wireless mouse or within a wireless keyboard when installed. The wireless mouse and the wireless keyboard are battery powered such that a single battery or pair of batteries provides all operating voltage for the device. In another embodiment, the mouse is wired to the keyboard and the wireless interface device is contained in the keyboard.

Moreover, other aspects of the present invention will become apparent with further reference to the drawings and specification, which follow.

BRIEF DESCRIPTION OF THE DRAWINGS

FIG. 12 is a logic diagram illustrating operation according to the present invention in providing link establishment indications.

DETAILED DESCRIPTION OF THE DRAWINGS

Figure 1A:
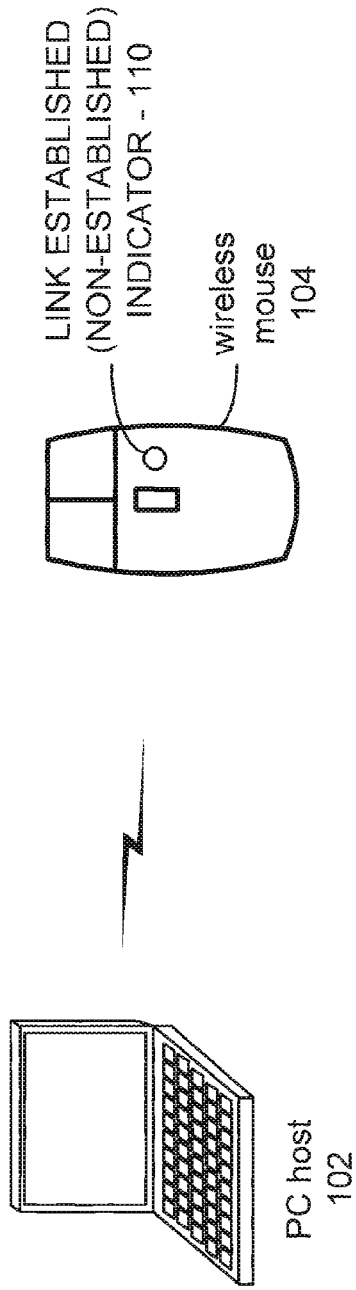
FIG. 1A is a system diagram illustrating a PC host and a wireless mouse that includes a wireless interface device constructed according to the present invention.

FIG. 1A is a system diagram illustrating a PC host 102 and a wireless mouse 104 that includes a wireless interface device constructed according to the present invention. As shown in FIG. 1A, the PC host 102 wirelessly couples to the wireless mouse 104. In the structure of FIG. 1A, the wireless mouse 104 includes a wireless interface device that operates to place the wireless mouse in any of a number of reduced power operating modes, including a power down mode in which battery life is substantially extended. As illustrated, the wireless mouse 104 may also include a link established/non-established indicator 110, which may be a light emitting diode, a liquid crystal display, or another type of visual indicator. In other embodiments, the link established/non-established indicator may provide non-visual indications, for example, audio indication. The operation of the devices of the present invention with respect to the indication of link/non-link with the wirelessly enabled host, PC host 102, will be described further with reference to FIGS. 2, 3, 4, 9 and 12.

Figure 1B:
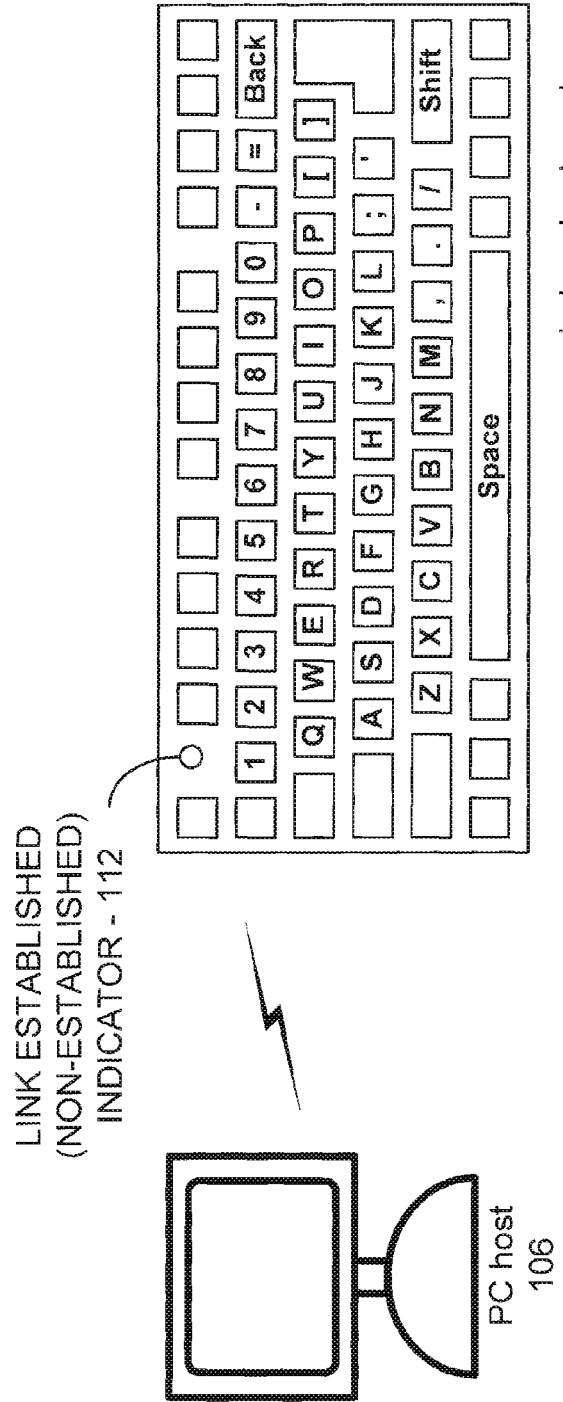
FIG. 1B is a system diagram illustrating a PC host and a wireless keyboard that includes a wireless interface device constructed according to the present invention.

FIG. 1B is a system diagram illustrating a PC host 106 and a wireless keyboard 108 that includes a wireless interface device constructed according to the present invention. The wireless keyboard 108 is battery powered and operates for extended periods on a single set of batteries because of the greatly reduced power consumption operations according to the present invention. As illustrated, the wireless keyboard 108 may also include a link established/non-established indicator 112, which may be a light emitting diode, a liquid crystal display, or another type of visual or non-visual indicator.

Figure 2:
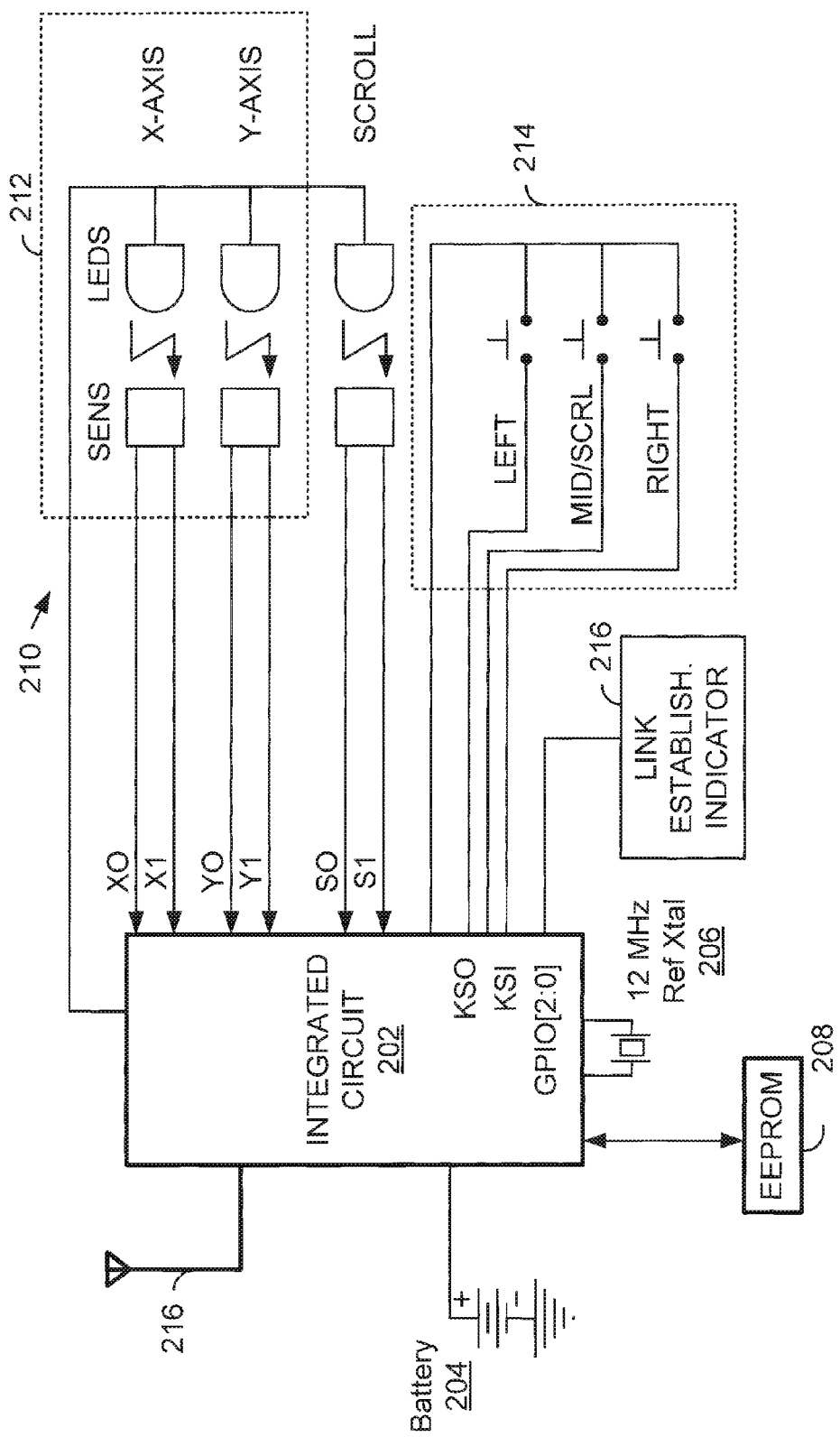
FIG. 2 is a schematic block diagram illustrating the structure of a wireless mouse that includes a wireless interface device constructed according to the present invention.

FIG. 2 is a schematic block diagram illustrating the structure of a wireless mouse that includes a wireless interface device constructed according to the present invention. An integrated circuit 202 constructed according to the present invention serves as the wireless interface device and couples to various mouse inputs 210. These mouse inputs 210 include x-axis and y-axis inputs as well as a scroll input. The x-axis and y-axis inputs are often referred to a "quadrature" inputs. The components that produce the quadrature inputs are generally referred to at numeral 212 and may be constructed from optical inputs instead of from conventional mechanical inputs. Referenced via numeral 214 are the button inputs that are typical with a computer mouse and include the left button input, the middle/scroll button input, and the right button input. As is shown, each of the signals produced by the mouse are received by integrated circuit 202. The integrated circuit 202 may also provide a link established indication/non-indication 216.

Integrated circuit 202 also couples to battery 204, crystal 206 that produces a 12 MHz reference frequency, EEPROM 208, and antenna 216. In one embodiment of the present invention, battery 204 comprises a pair of either AA batteries or AAA batteries. Antenna 216 is an internal antenna in the described because of the size constraints of the mouse and because of the relatively short distance between the PC host and the wireless mouse.

Figure 3:
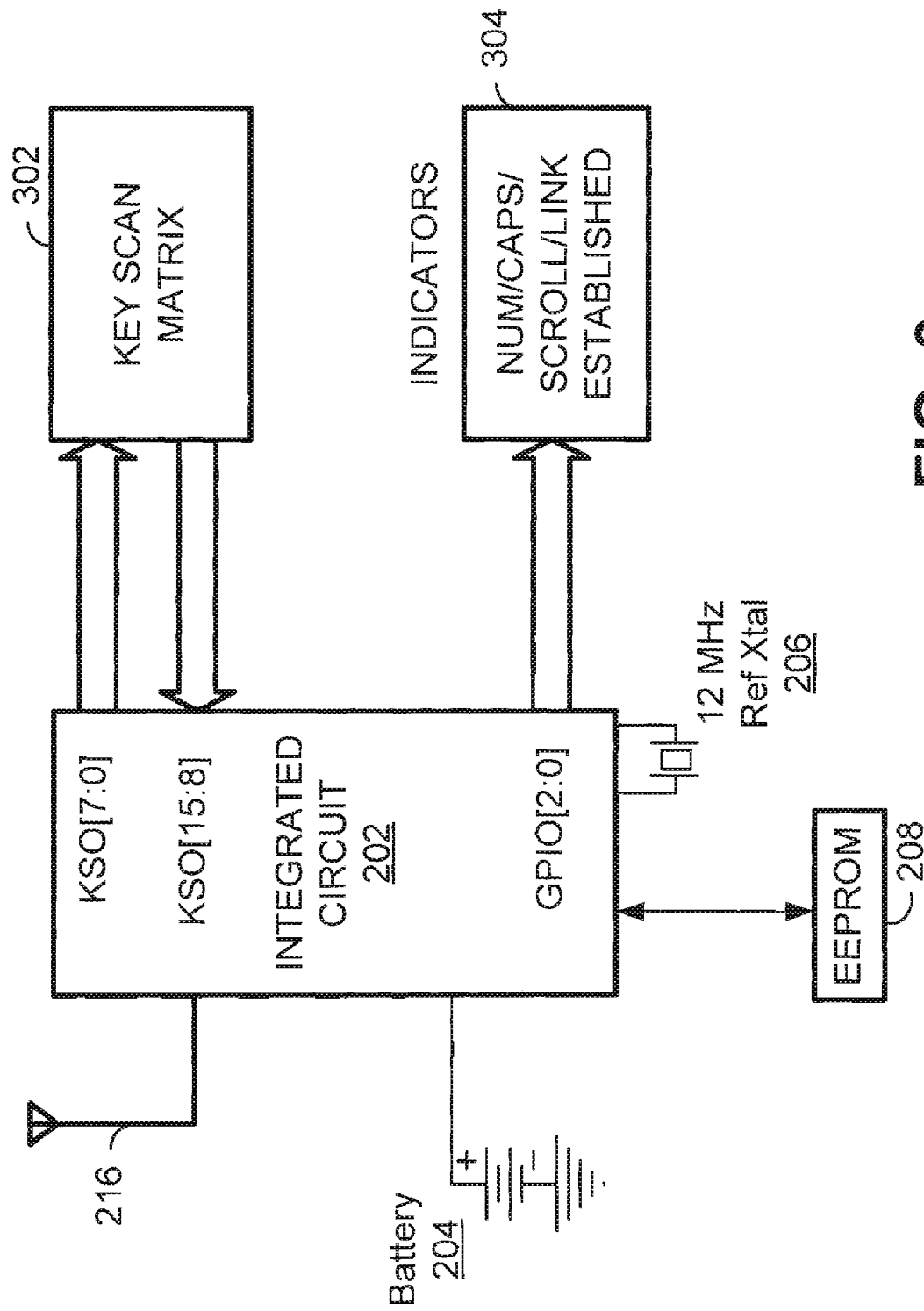
FIG. 3 is a schematic block diagram illustrating the structure of a wireless keyboard that includes a wireless interface device constructed according to the present invention.

FIG. 3 is a schematic block diagram illustrating the structure of a wireless keyboard that includes a wireless interface device (integrated circuit 202) constructed according to the present invention. As shown in FIG. 3, integrated circuit 202 services a key scan matrix 202 that provides inputs from the keyboard. Indicators 304 include num-lock, caps-lock, scroll-lock indicator lights, and link established/non-established indicators that are lit on the keyboard. The integrated circuit 202 couples to a battery 204, a crystal 206, an EEPROM 208, and an antenna 216.

In another embodiment (not shown in either FIG. 2 or FIG. 3), the integrated circuit 202 services both mouse and keyboard input and may reside internal to either the mouse or the keyboard. As is relatively apparent to the reader, because the input signals differ, multiplexing or signal sharing may be required. However, different signal lines may be dedicated for keyboard and for mouse inputs such that no signal sharing is required. As is apparent, when the integrated circuit 202 alone services both mouse and keyboard input wired connectivity between the keyboard and the mouse is required.

Figure 4:
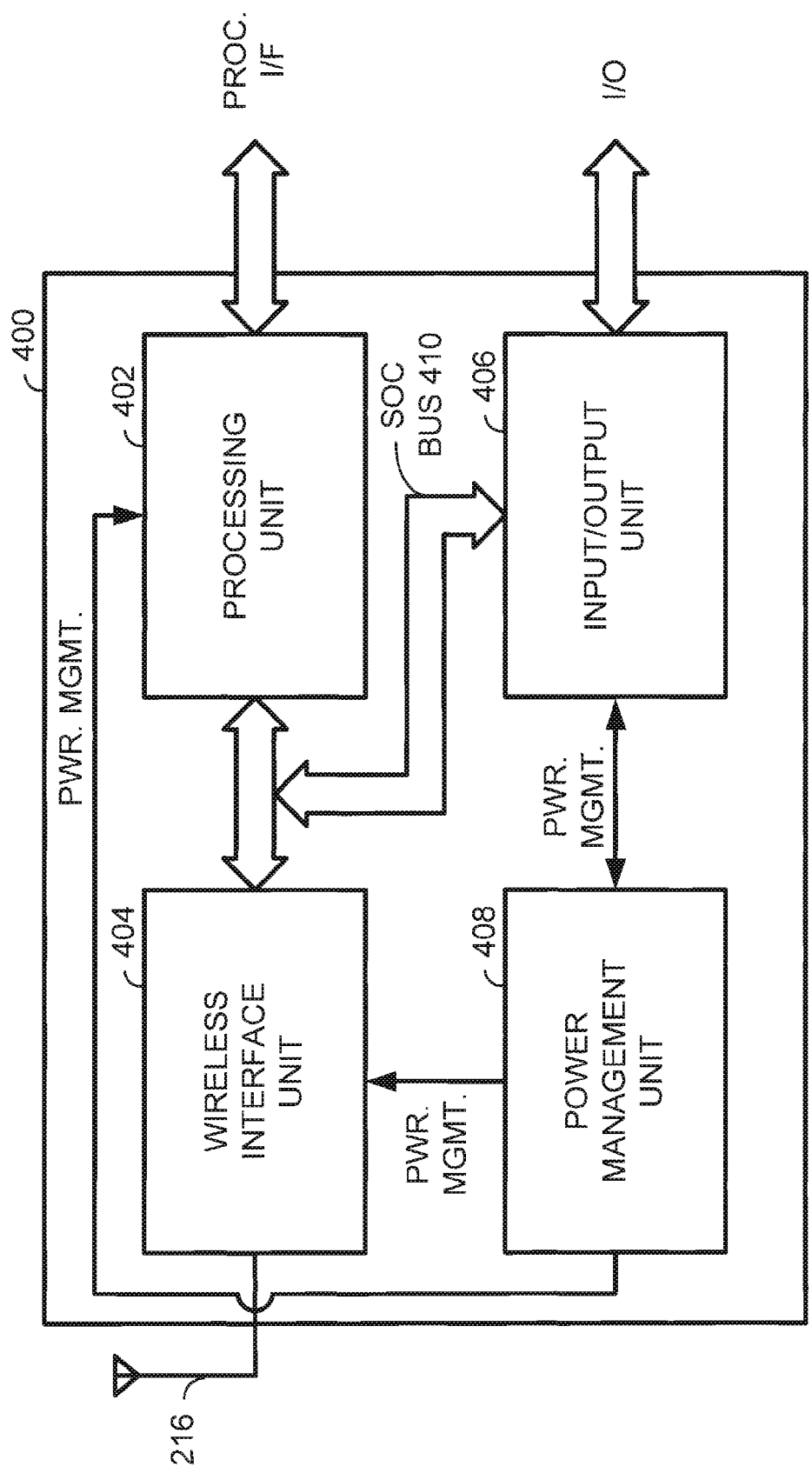
FIG. 4 is a block diagram illustrating a wireless interface device (integrated circuit) constructed according to the present invention.

FIG. 4 is a block diagram illustrating a wireless interface device (integrated circuit) constructed according to the present invention. As shown in FIG. 4, the wireless interface device 400 includes a processing unit 402, a wireless interface unit 404, an input/output unit 406, and a power management unit 408. The wireless interface unit 404 couples the wireless interface device 400 to antenna 216. The wireless interface unit 404 operates according to the Bluetooth specification and in particular to the Human Interface Device (HID) portion of the Bluetooth specification.

Processing unit 402, wireless interface unit 404, and input/output unit 406 couple with one another via a system on chip (SOC) bus 410. Processing unit 402 includes a processing interface that may be used to couple the processing unit to one or more devices devices. Input/output unit 406 includes an input/output set of signal lines that couple the wireless interface device 400 to at least one user input device, for example, keyboard and/or mouse.

According to the present invention, the processing unit 402 and the wireless interface unit 404 interact to determine when the wireless interface unit 404 has established a link with the wirelessly enabled host. Further, when the wireless interface unit 404 has established a link with the wirelessly enabled host, the processing unit 402 interacts with the input/output unit 406 to direct the input/output unit 406 to output a link established indication.

In performing these operations, the wireless interface device 400 indicates to the user when the wireless user input device is in communication with the wirelessly enabled host. If the serviced mouse, keyboard, etc. is not responsive even when link establishment is indicated, the user will then know that the operational problem is likely with the wirelessly enabled host. Further, when wireless interface device does not indicate that a link is established, the user will know that the wireless user input device requires attention. Attention may require the changing of batteries, more proximal location of the wireless user input device to the wirelessly enabled host, or other action.

Figure 5:
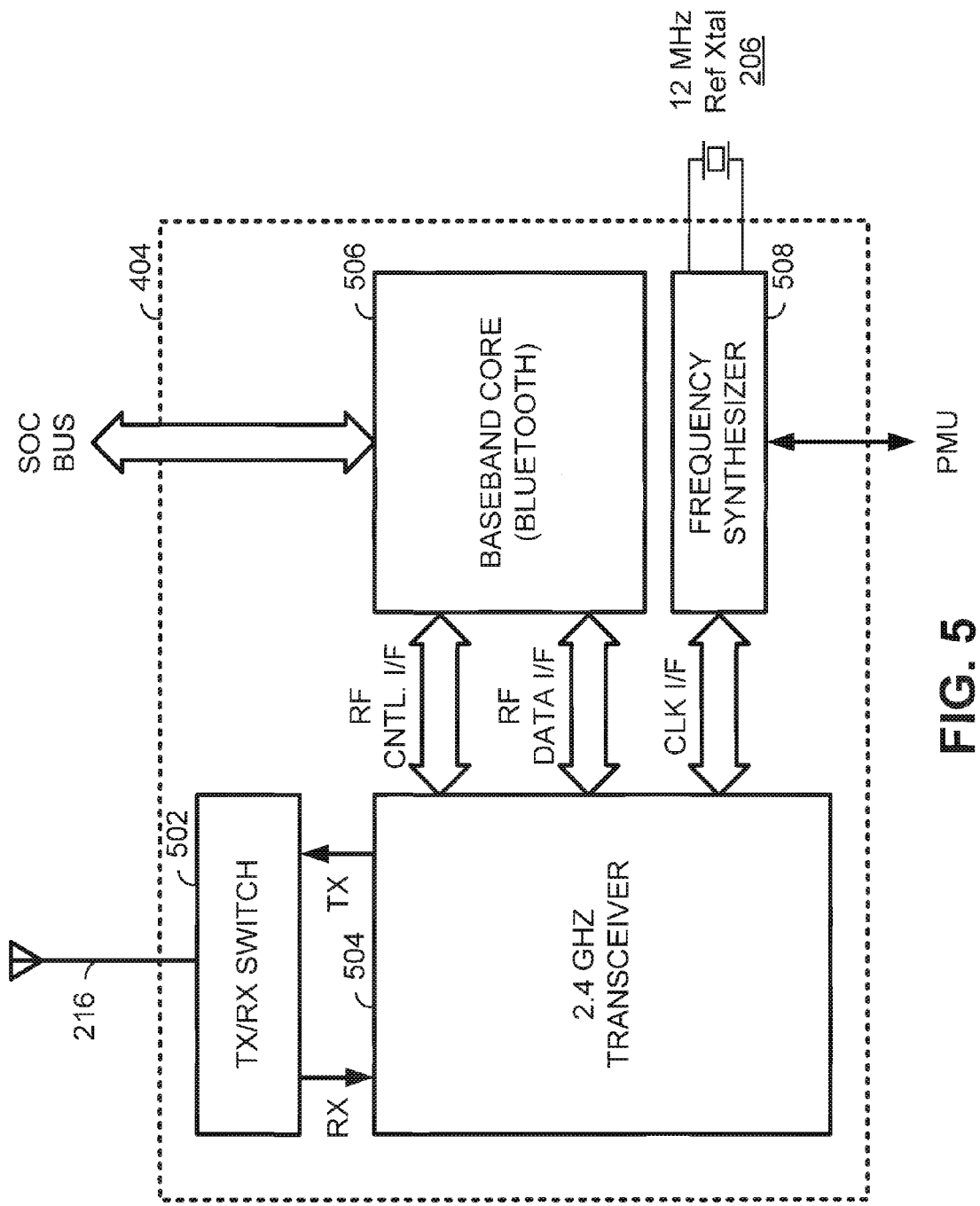
FIG. 5 is a block diagram illustrating a wireless interface unit of the wireless interface device of FIG. 4.

FIG. 5 is a block diagram illustrating a wireless interface unit of the wireless interface device of FIG. 4. The wireless interface unit 404 includes a transmit/receive switch 502, a 2.4 GHz transceiver 504, a Bluetooth core 506, and a frequency synthesizer 508. Each of these components is generally known in the field and will be described in minimal detail herein.

The transmit/receive switch 502 couples to antenna 216 and switches between transmit and receive operations. The 2.4 GHz transceiver 504 performs all RF front-end operations and operates within a frequency band and on particular channels as are specified by the Bluetooth operating standard. The 2.4 GHz transceiver 504 couples to baseband core 506, which in the present invention is a Bluetooth baseband core. Such coupling is performed via an RF control interface and an RF data interface. The RF control interface performs the necessary control operations to guaranty that the 2.4 GHz transceiver 504 and the baseband core 506 will operate consistently with desired operating specifications. The RF data interface transfers both Rx and Tx data between the 2.4 GHz transceiver 504 and the baseband core 506. Frequency synthesizer 508 couples to the power management unit 408, to the external crystal 206 operating at 12 MHz, and to the 2.4 GHz transceiver 504. The frequency synthesizer 508 is controlled to provide an RF frequency for the 2.4 GHz transceiver 504 which is used to mix with the baseband signal received from the baseband core during a transmit operation and to mix with the received RF signal during a receive operation. The baseband core 506 couples to other wireless interface devices via the SOC bus 410.

Figure 6:
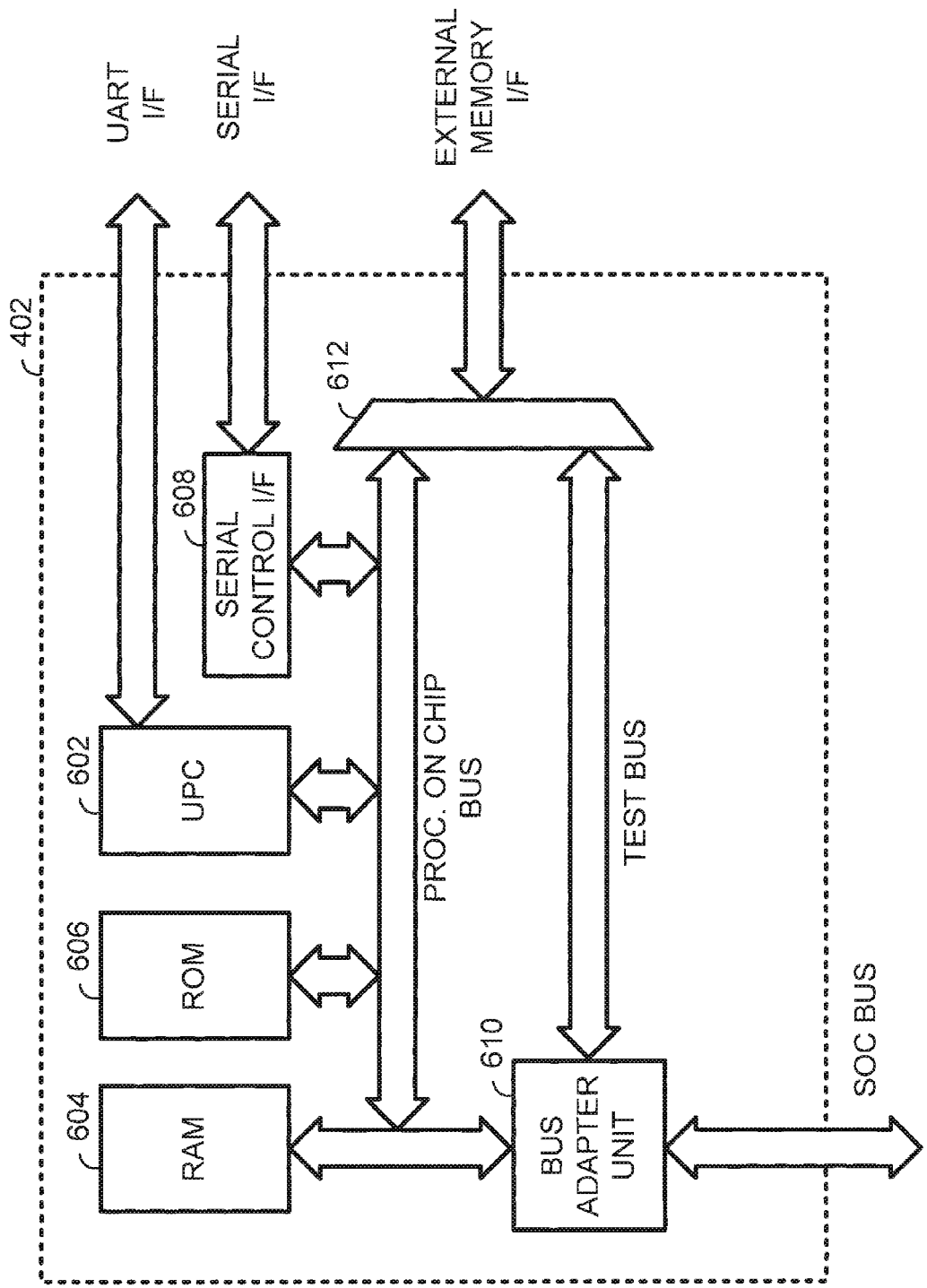
FIG. 6 is a block diagram illustrating a processing unit of the wireless interface device of FIG. 4.

FIG. 6 is a block diagram illustrating a processing unit 402 of the wireless interface device of FIG. 4. The processing unit 402 includes a microprocessor core 602, read only memory 606, random access memory 604, serial control interface 608, bus adapter unit 610, and multiplexer 612. The microprocessor core 602, ROM 606, RAM 604, serial control interface 608, bus adapter unit 610, and multiplexer 612 couple via a processor on a chip bus. Multiplexer 612 multiplexes an external memory interface between the processor on a chip bus and a test bus. The bus adapter unit 610 interfaces the processor on a chip bus with the SOC. The microprocessor core 602 includes a universal asynchronous receiver transmitter interface that allows direct access to the microprocessor core. Further, the serial control interface 608 provides a serial interface path to the processor on a chip bus.

Figure 7:
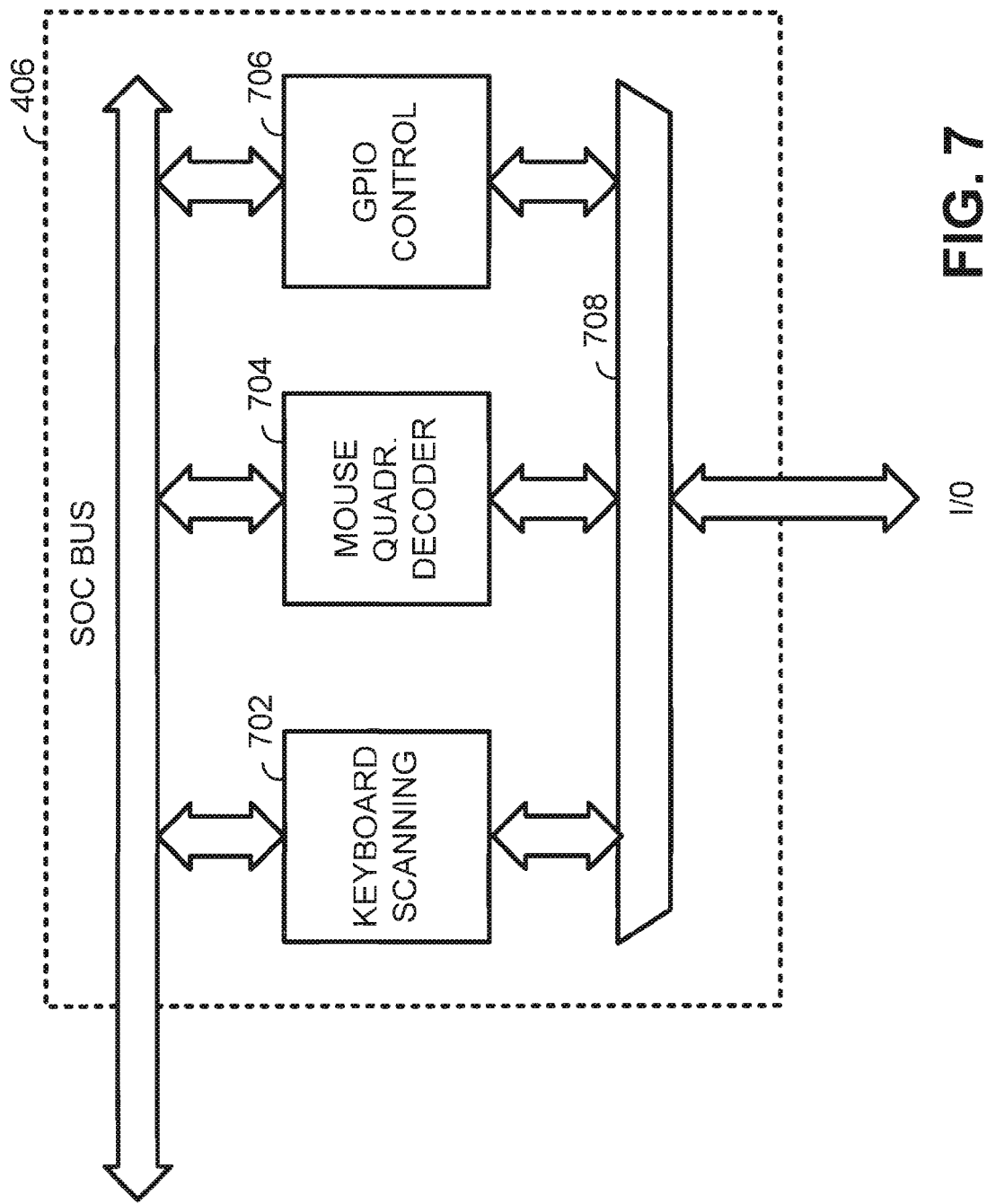
FIG. 7 is a block diagram illustrating an input/output unit of the wireless interface device of FIG. 4.

FIG. 7 is a block diagram illustrating an input/output unit 406 of the wireless interface device of FIG. 4. The input/output unit 406 includes a keyboard-scanning block 702, a mouse quadrature decoder block 704, and a GPIO control block 706. Each of the keyboard scanning block 702, the mouse quadrature decoder block 704, and the GPIO control block 706 couple to the SOC bus. Further, each of the keyboard scanning block 702, the mouse quadrature decoder block 704, and the GPIO control block 706 couple to I/O via multiplexer 708. This I/O couples to the at least one user input device.

In another embodiment of the input/output unit 406, each of the keyboard scanning block 702, the mouse quadrature decoder block 704, and the GPIO control block 706 couples directly to external pins that couple to the at least one user input device.

Figure 8:
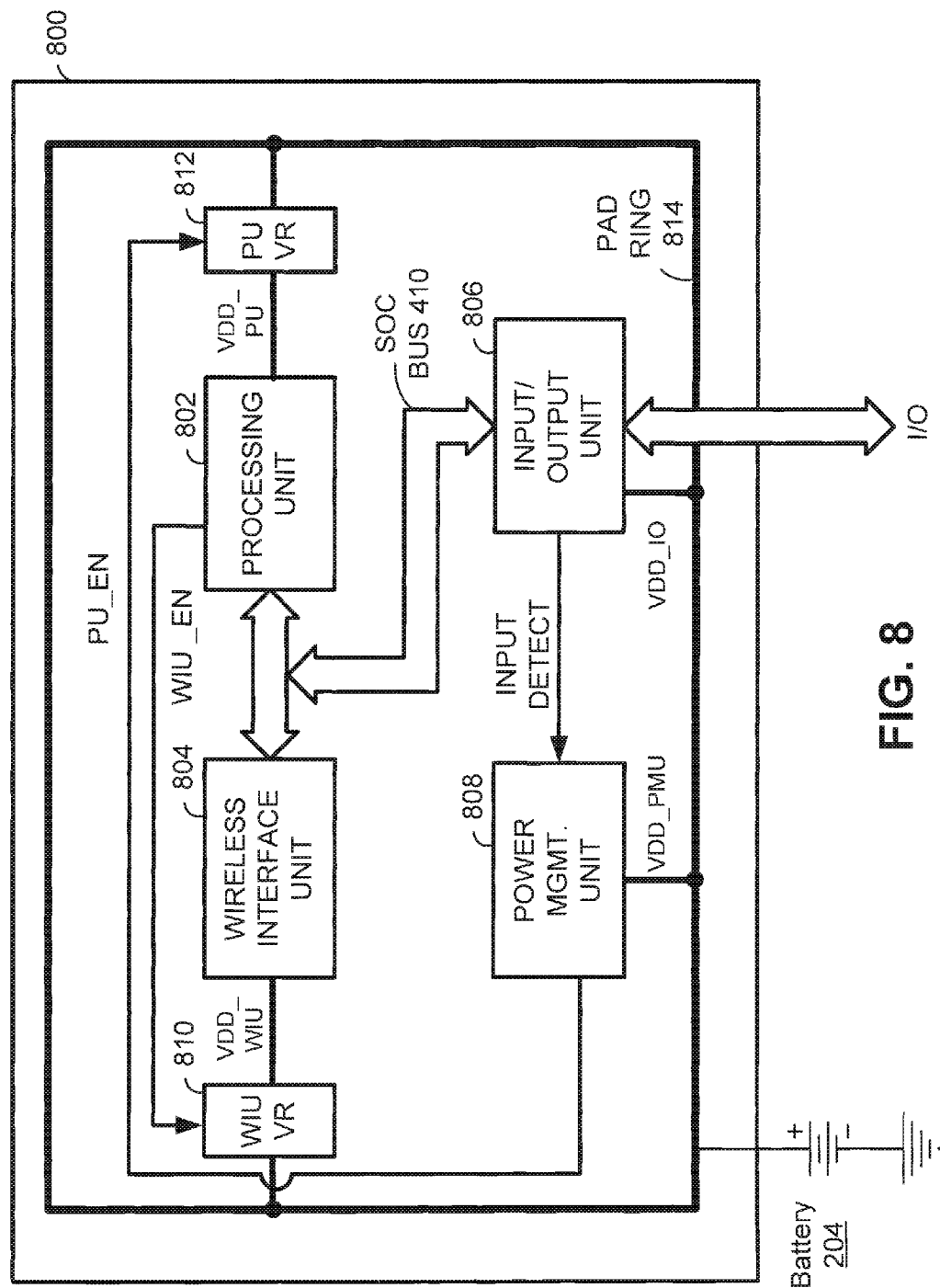
FIG. 8 is a block diagram generally showing the structure of an integrated circuit constructed according to the present invention with particular detail in the coupling of battery power to the units of the device.

FIG. 8 is a block diagram generally showing the structure of an integrated circuit constructed according to the present invention with particular detail in the coupling of battery power to the units of the device. Integrated circuit 800 of FIG. 8 includes a wireless interface unit 804, processing unit 802, input/output unit 806, and power management unit 808. The processing unit 802, wireless interface unit 804, and input/output unit 806 couple via a SOC bus 410. Further, as was previously described, input/output unit 806 couples to at least one user input device via I/O connection.

With the integrated circuit 800 of FIG. 8, a pad ring 814 surrounds a substantial portion of the components of the integrated circuit. The pad ring 814 couples directly to battery 204, which powers the pad ring. Further, input/output unit 806 and power management unit 808 couple directly to pad ring 814 to receive their power and voltage. However, processing unit 802 couples to pad ring 814 via processing unit voltage regulation circuitry 812. Further, the wireless interface unit 804 couples to pad ring 814 via wireless interface unit voltage regulation circuitry 810. The processing unit voltage regulation circuitry 812 is controlled by the power management unit 808 via control signal PU_EN. Further, the wireless interface unit voltage regulation circuitry 810 is controlled by the processing unit 802 using control signal WIU_EN.

The integrated circuit operates in four different power-conserving modes: (1) busy mode; (2) idle mode; (3) suspend mode; and (4) power down mode. Busy mode, idle mode, and suspend mode are described in the Bluetooth specification. However, power down mode is unique to the present invention. Three different power down modes are described herein.

In busy mode mode, the Master (host computer) is actively polling the HID (wireless mouse, wireless keyboard, etc.) for data at a polling rate near 100 polls/second, or about once every 16 Bluetooth slot times (one Bluetooth slot is 625 µS). Continued user activity (keypad strokes, mouse motion, button presses, etc.) keeps the HID in busy mode. If there has been no activity for a few seconds (determined by particular settings), operation transitions to idle mode.

In idle mode, the HID requests the master (serviced host) to enter sniff mode with a sniff interval that is chosen based on desired latency and average power consumption. In one operation, the sniff interval is 50 ms, or about every 80 slot times. Although the HID can wake up immediately after an event, it may have to wait up to 100 mS to transmit its data to the host, and therefore must have enough buffer space to store 100 mS of events. If an event occurs, the HID requests the master to leave sniff mode. If there is no further activity for a longer period, the HID transitions from idle mode to suspend mode.

When entering suspend mode, there is a brief return on the connection state to busy mode to renegotiate the sniff interval to the suspend interval time. Then, the HID is parked. In suspend mode, a longer beacon interval can be used for a lower power state. When in suspend mode, any user input detected will result in the HID requesting to be unparked and transitioned back to the busy mode. When the HID is parked, it consumes less power than when the host is in sniff mode since the HID does not have to transmit. In suspend mode, the HID just listens to the beacons to remain synchronized to the master's frequency hopping clock. As long as the master continues transmitting (meaning the host is not turned off) the HID will remain in suspend mode mode. If link loss occurs due to the host being turned off without warning, or the host moving out of range, the Lost Link state will be entered. In another embodiment of the present invention, while in the suspend mode, the HID continues to remain in the sniff Bluetooth mode rather than being parked, for example, with a longer sniff interval.

According to the present invention, the power down mode is also supported. In the power down mode, the power management unit 808 operates the processing unit voltage regulation circuitry 812 and the wireless interface unit voltage regulation circuitry 810 to power down the processing unit 802 and wireless interface unit 804, respectively. These states of operation will be described further with reference to FIGS. 9, 10, and 11.

Figure 9:
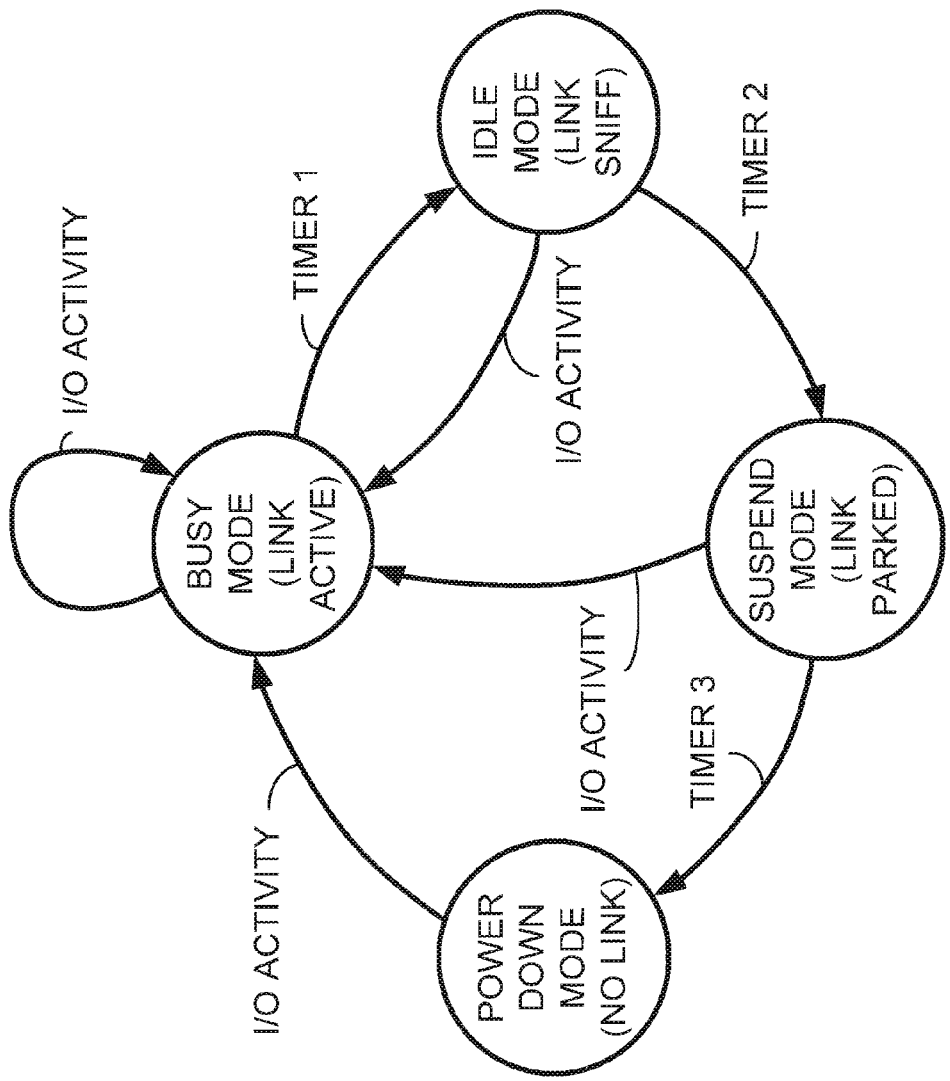
FIG. 9 is a logic diagram illustrating operation according to the present invention.

FIG. 9 is a logic diagram illustrating operation according to the present invention. As illustrated in FIG. 9, a wireless interface device operating according to the present invention operates in four separate power-conserving modes. These power conservation modes include the busy mode, the idle mode, the suspend mode and, the power down mode. The state diagram of FIG. 9 shows how each of these modes is reached during normal operation.

When the wireless interface device is initially powered up, it enters the busy mode of operation. In the busy mode of operation, all features and wireless operations of the wireless interface device are enabled. As long as I/O activity continues, the wireless interface device remains in the busy mode. However, after expiration of a first timer with no I/O activity, the operation moves from the busy mode to the idle mode. Operation will remain in idle mode until the expiration of a second timer or until I/O activity occurs.

If while in the idle mode I/O activity occurs, operation returns to the busy mode. If in the idle mode, if timer 2 expires with no additional I/O activity, suspend mode is entered. While in suspend mode, if I/O activity occurs, operation returns to busy mode. However, if in suspend mode, no additional I/O activity occurs until the expiration of a third timer, power down mode is entered. While in the power down mode, operation will remain in the power down mode until I/O activity occurs. When I/O activity occurs, operation of the wireless interface device will move from the power down mode to the busy mode.

When the wireless interface device is in the busy mode the wireless interface unit is typically linked to the wirelessly enabled host and the processing unit interacts with the input/output unit to provide a link established indication. However, when link is lost, the wirelessly enabled host and the processing unit interact with the input/output unit to provide a link non-established indication. Further, when the wireless interface device is in the idle mode the wireless interface unit enters a sniff mode of operation. When the wireless interface is in the sniff mode of operation, the processing unit interacts with the input/output unit to provide a second link established indication. The second link established indication differs from the first link established indication to indicate to the user that the wireless input device may not be immediately responsive in forwarding input, for example, key strokes or mouse movement, to the wirelessly enabled host. Alternatively, when the wireless interface device is in the suspend mode the wireless interface devices places the wireless interface unit in a parked mode of operation. In such case, the processing unit may also interact with the input/output unit to provide a third (or second) link established indication for the same reasons.

In still another operation, when the wireless interface device enters a power down mode of operation the processing unit interacts with the input/output unit to provide a link non-established indication. In such case, the wireless interface unit is powered down. Moreover, when the wireless interface device transitions from a power saving mode to the busy mode, the processing unit may interact with the input/output unit to provide a link being attempted indication. These various indications provide feedback to the user to indicate the link status of the wireless user input device.

In one particular embodiment of these operations, a link established indication is indicated by a turned-on non-flashing LED (or other turn-on indication), a link non-established indication is represented with a turned-off LED, and the PARK mode and sniff mode are indicated by flashing LEDs. Further, the link being attempted indication may also be represented as a flashing indicator with a differing flashing period.

Figure 10:
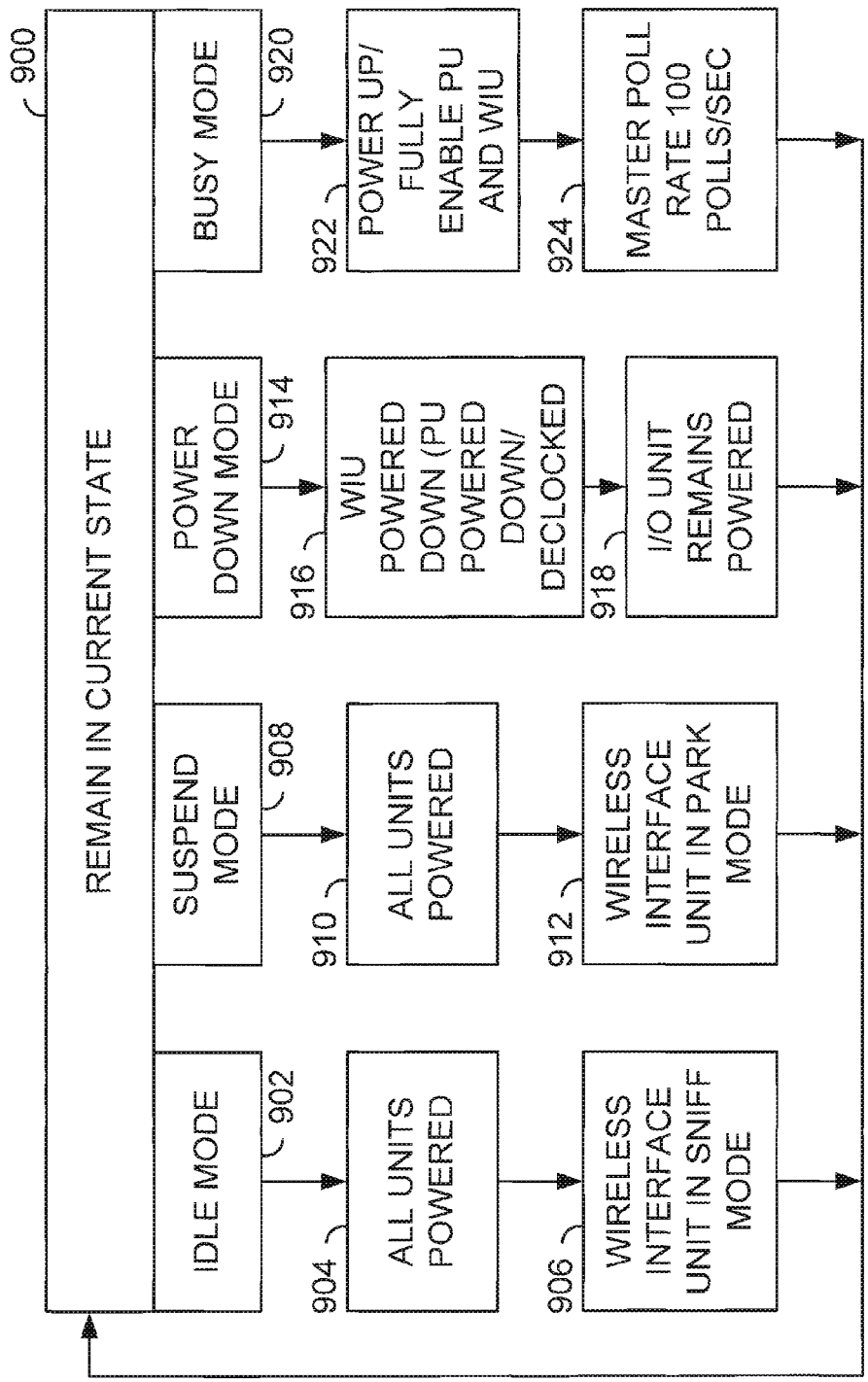
FIG. 10 is a logic diagram illustrating operation according to the present invention in controlling the power consumption of a serviced device.

FIG. 10 is a logic diagram illustrating operation according to the present invention in controlling the power consumption of a serviced device. As shown in FIG. 10, once operation in a particular power conservation state, for example, busy mode, idle mode, suspend mode, and power down mode has commenced, operation will remain in that state until expiration of respective timer or I/O activity occurs (step 900).

When power conservation operation occurs to move from the busy mode to the idle mode (step 902), all portions of the wireless interface device remain powered (step 904). However, in the idle mode, the wireless interface unit enters a sniff mode in which some of its operations are reduced. Such operations were previously described with reference to FIG. 9. Further, additional information regarding this mode is available in the Bluetooth HID standard.

When the operation of the wireless interface device transitions from the idle mode to the suspend mode (step 908) all portions of the wireless interface device remain powered (step 910). However, the wireless interface unit of the wireless interface device enters the park mode, which consumes even less power than does the wireless interface unit when in the sniff mode.

When in the suspend mode if an additional timer or inactivity period expires, the wireless interface device will transition to the power down mode (step 914). In the power down mode, the wireless interface unit 804 is powered down and the processing unit 802 is placed into a power conservation state (step 916). In a first power down mode, the power management unit 808 powers down the wireless interface unit 804 and the processing unit 802. In this mode of operation, battery consumption of the wireless interface device is significantly reduced. However, in the power down operation, the input/output unit 806 remains powered such that it can receive input from a coupled user input device. The input/output unit 806 indicates to the power management unit 808 when it receives any user input. When user input is received, the input/output unit 806 notifies the power management unit 808 that activity has commenced. In response, the power management unit 808 powers up the wireless interface unit 804 and the processing unit 802 so that the input can be relayed to the wirelessly enabled host. Second and third power down modes will be described with reference to FIG. 11.

From any of the reduced power operating states, when I/O activity is sensed by the I/O block, the wireless input device will transition back to the busy mode (step 920). When such operation occurs, all components will be fully enabled (step 922). Then, in the busy mode, the wireless interface unit will operate in its normal state in which the master wireless device, that is, wirelessly enabled host will poll the wireless interface device at 100 times per second. From each of steps 906, 912, 918, and 924, operation returns to step 902 wherein the current power conservation state will be kept until another event occurs.

Figure 11:
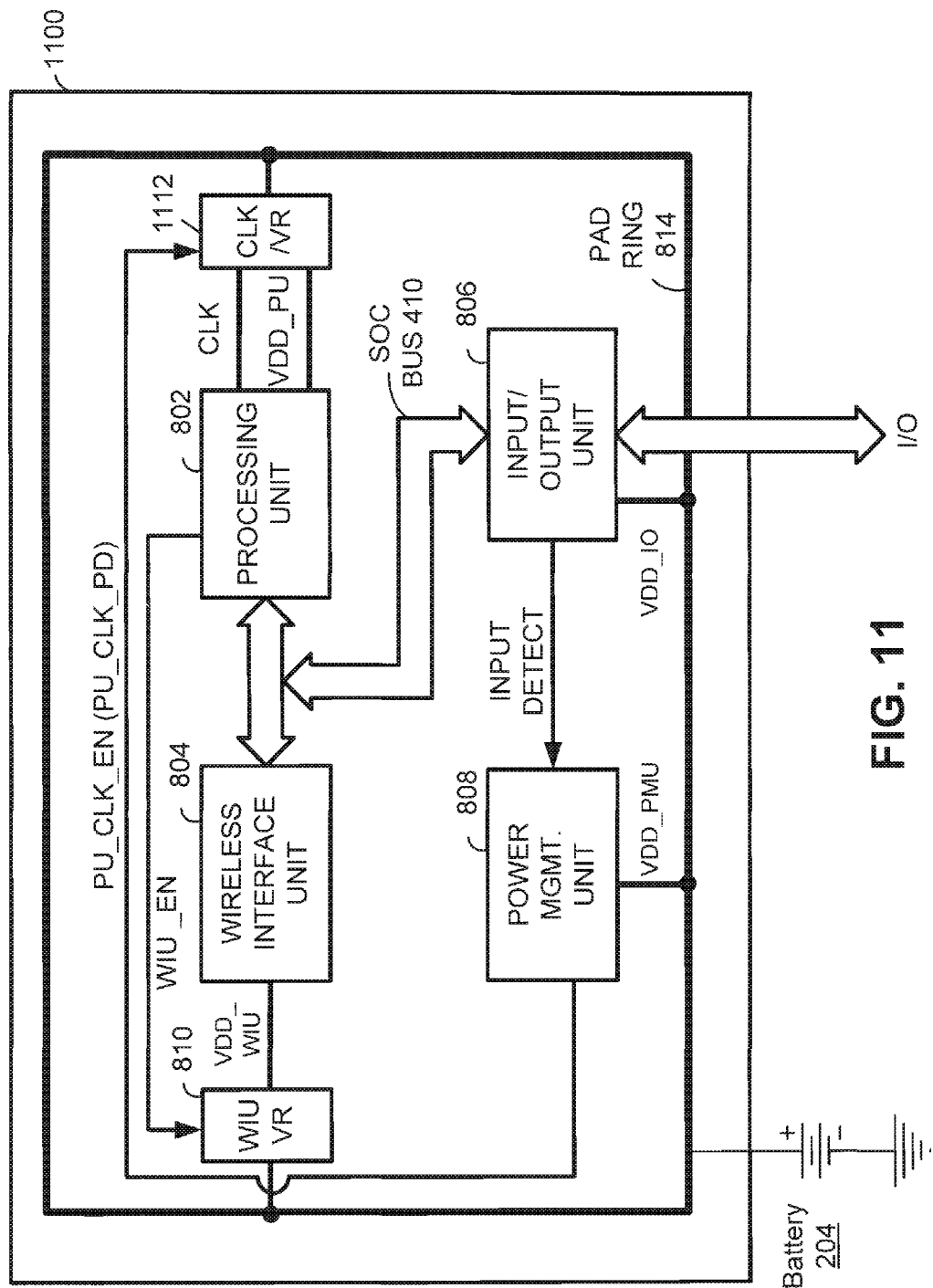
FIG. 11 is a block diagram generally showing an alternate structure of an integrated circuit constructed according to the present invention with particular detail in the coupling of battery power to the units of the device.

FIG. 11 is a block diagram generally showing an alternate structure of an integrated circuit constructed according to the present invention with particular detail in the coupling of battery power to the units of the device. The integrated circuit 1100 of FIG. 11 is similar in structure to the integrated circuit of FIG. 8. However, with the integrated circuit of FIG. 11, a clock/voltage regulator 1112 couples the processing unit 802 to the pad ring and controls not only the voltage supply VDD_PU to the processing unit 802 but also the clock input to the processing unit 802. The integrated circuit 1100 of FIG. 11 supports the second and third power down modes (as well as the first power down mode) of the present invention.

In a second power down mode, the processing unit 802 instructs the wireless interface unit 804 to power down by communicating with it over the system bus 410. The processing unit 802 then informs the power management unit 808 that it is ready to have its clock gated. The power management unit 808 then gates the system clock supplied to the processing unit 802. The total power consumption of the processing unit 802 is a function of the sum of both the static and dynamic current that it consumes. Dynamic current is generally linearly related to the clock frequency driving the logic. Static current, also called quiescent current, is typically due to leakage, and is a function of the size of the circuit. By gating the clock, the power consumption of the processing unit 802 is reduced to only the static component of the current. Particularly in CMOS technology, the static current is on the order of microamps. Hence, the current pulled by the processing unit 802 is reduced to a very small level, while maintaining the state of all memory circuits within the part. The clock oscillator 1112 is left running in this mode, enabling the power management unit to resume full operation of the processing unit by simply ungating the clock.

With a third power down mode, the clock oscillator is turned off. This has the same effect as gating the clock, as in the second mode, but also eliminates the current consumed in the clock oscillator. When the input/output unit 806 detects user input, the input/output unit 806 notifies the power management unit 808 that activity has commenced. In response, the power management unit 808 powers up the clock oscillator 1112 and the processing unit as well as the wireless interface units so that the input can be relayed to the wirelessly enabled host. Table 1 illustrates examples of power consumption according to the present invention.

TABLE 1

| | Power Down Modes | | | | | |
|---|---|---|---|---|---|---|
| | Wireless I/F Unit | Clock Oscillator | Proc. Unit | I/O Unit | Power | Comment |
| Busy Mode | On | On | On | On | 40 mA | Full operation |
| Power Down Mode 1 | Off | On | On/Clock gated | On | 1 mA | Core leakage + Xtal Osc currents incurred |
| Power Down Mode 2 | Off | Off | On | On | 200 uA | Core leakage current incurred |
| Power Down Mode 3 | Off | Off | Off | On | 50 uA | All memory lost, must do full reboot |

FIG. 12 is a logic diagram illustrating operation according to the present invention in providing link establishment indications. Operation commences at the startup of the wireless interface device (Integrated Circuit) at step 1202. After startup, the wireless interface unit is initialized (step 1204) along with the other components of the IC. After initialization, the wireless interface unit attempts to establish al ink with the serviced wirelessly enabled host (step 1206). If initial link establishment is not successful, as determined at step 1208, operation returns to step 1206. However, if link establishment is successful, operation proceeds to step 1210 wherein the processing unit and the wireless interface unit interact to determine that a link with the wirelessly enabled host has been established. The processing unit then interfaces with the input/output unit to enable the link established indicator (step 1212).

From step 1212, operation proceeds to step 1214 wherein the wireless interface device and the wireless link established thereby with the wirelessly enabled host services user input (step 1214). From step 1214, the link may be lost, the link may be dropped, or the link may be altered. At step 1216, when the link is lost (unintentionally), operation proceeds to step 1206 wherein the wireless interface device attempts to reestablish the link with the wirelessly enabled host. During this operation, the processing unit may interact with the input/output unit to provide an indication that link establishment is being attempted. When the link is dropped intentionally (step 1218), which may be done when the wireless interface enters the power down mode, reestablishment is not immediately attempted. Thus, when it is determined that link reestablishment should be attempted (step 1222) operation proceeds to step 1206. However, if an attempt to reestablish the link is not desired, for example, when the wireless interface device is completely powering down, operation ends. Also, from step 1214, the link may be altered, for example, entering sniff mode or park mode (step 1220). In such case, operation proceeds to step 1212 wherein the processing unit interfaces with the input/output unit to provide a second link established indication, for example.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (for example, an item includes, but is not limited to, a component, an element, a circuit, and/or a module) where, for indirect coupling, the intervening item does not modify the information of a signal but may adjust its current level, voltage level, and/or power level. As may further be used herein, inferred coupling (that is, where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that a first signal has a greater magnitude than a second signal, a favorable comparison may be achieved when the magnitude of the first signal is greater than that of the second signal or when the magnitude of the second signal is less than that of the first signal.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

What is claimed is:

1. A wireless interface device that services communications between a wirelessly enabled host and at least one user input device, the wireless interface device comprising:
    a wireless interface unit that wirelessly interfaces with the wirelessly enabled host;
    a processing unit operably coupled to the wireless interface unit;
    an input/output unit operably coupled to the wireless interface unit and to the processing unit, wherein the input/output unit interfaces to the at least one user input device;
    wherein the processing unit and the wireless interface unit interact to determine when the wireless interface unit has established a link with the wirelessly enabled host; and
    wherein when the wireless interface unit has established the link with the wirelessly enabled host, the processing unit interacts with the input/output unit to direct the input/output unit to output a link established indication.

2. The wireless interface device of claim 1, further comprising a power management unit that manages power consumption of the wireless interface device, wherein the wireless interface device supports a plurality of power consumption modes including a busy mode and at least one power saving mode.

3. The wireless interface device of claim 2, wherein when the wireless interface device is in the busy mode the processing unit interacts with the input/output unit to provide a first link established indication.

4. The wireless interface device of claim 3, wherein:
    when the wireless interface device is in the at least one power saving mode the wireless interface unit enters a parked mode of operation; and
    when the wireless interface unit is in the parked mode of operation, the processing unit interacts with the input/output unit to provide a second link established indication.

5. The wireless interface device of claim 3, wherein:
    when the wireless interface device is in the at least one power saving mode the wireless interface unit enters a sniff mode of operation; and
    when the wireless interface unit is in the sniff mode of operation, the processing unit interacts with the input/output unit to provide a second link established indication.

6. The wireless interface device of claim 3, wherein:
    when the wireless interface device is in the at least one power saving mode the wireless interface unit enters a power down mode of operation; and
    when the wireless interface unit is in the power down mode of operation, the processing unit interacts with the input/output unit to provide a link non-established indication.

7. The wireless interface device of claim 2, wherein when the wireless interface device transitions from a power saving mode to the busy mode, the processing unit interacts with the input/output unit to provide a link being attempted indication.

8. The wireless interface device of claim 1, wherein the wireless interface unit supports one or more versions of the Bluetooth interface standard.

9. The wireless interface device of claim 1, wherein the wireless interface device is formed as a single monolithic integrated circuit.

10. The wireless interface device of claim 1, wherein the wireless interface device enters one of a plurality of power consumption operating states comprising:
    busy mode in which all components of the wireless interface device are powered and operational;
    idle mode in which the wireless interface unit performs first power conserving operations; and
    power down mode in which the wireless interface unit is powered down and the processing unit enters one of a plurality of reduced power operations.

11. A method for controlling the operation of a wireless interface device that services communications between a wirelessly enabled host and at least one user input device, the wireless interface device including a wireless interface unit, a processing unit, and an input/output unit that couples to the at least one user input device, the method comprising:

the wireless interface unit establishing a wireless link with the wirelessly enabled host;

the wireless interface unit interacting with the processor to indicate to the processing that the wireless interface unit has established a link with the wirelessly enabled host;

the processing unit interacting with the input/output unit to direct the input/output unit to output a link established indication; and the input/output unit outputting the link established indication.

12. The method of claim 11, further comprising the wireless interface device supporting a plurality of power consumption modes including a busy mode and at least one power saving mode.

13. The method of claim 12, wherein in the busy mode the input/output unit provides a first link established indication.

14. The method of claim 13, wherein:

in the at least one power saving mode the wireless interface unit enters a parked mode of operation; and when the wireless interface unit is in the parked mode of operation, the input/output unit provides a second link established indication.

15. The method of claim 13, wherein:

in the at least one power saving mode the wireless interface unit enters a sniff mode of operation; and when the wireless interface unit is in the sniff mode of operation, the input/output unit provides a second link established indication.

16. The method of claim 13, wherein:

in the at least one power saving mode the wireless interface unit enters a power down mode of operation; and when the wireless interface unit is in the power down mode of operation, the input/output unit provides a link non-established indication.

17. The method of claim 12, wherein when the wireless interface device transitions from a power saving mode to the busy mode, the processing unit interacts with the input/output unit to provide a link being attempted indication.

18. The method of claim 11, wherein the wireless interface unit supports one or more versions of the Bluetooth interface standard.

19. The method of claim 11, wherein the at least one user input device is selected from the group consisting of cursor control devices and keypads.

20. The method of claim 11, wherein the wireless interface device enters one of a plurality of power consumption operating states comprising:

busy mode in which all components of the wireless interface device are powered and operational;

idle mode in which the wireless interface unit performs first power conserving operations; and power down mode in which the wireless interface unit is powered down and the processing unit enters one of a plurality of reduced power operations.

\* \* \* \* \*